United States Patent [19]
Eaton

[15] 3,640,174
[45] Feb. 8, 1972

[54] PYROMECHANICAL RELEASE DEVICE
[72] Inventor: Bruce Eaton, San Jose, Calif.
[73] Assignee: The United States of America as represented by the Secretary of the Air Force
[22] Filed: Jan. 13, 1971
[21] Appl. No.: 106,066

[52] U.S. Cl. .................................................. 85/9, 89/1 B
[51] Int. Cl. ........................................................ F16b 21/10
[58] Field of Search ............... 85/1, 9, 5 B, DIG. 1; 89/1 B

[56] References Cited

UNITED STATES PATENTS

| 3,119,298 | 1/1964 | Brown | 85/1 R |
| 3,319,520 | 5/1967 | Stefano et al. | 89/1 B |
| 3,444,773 | 5/1969 | Ligne | 85/9 R |
| 3,541,920 | 11/1970 | Rapp | 89/1 B |
| 3,546,999 | 12/1970 | Hosang | 85/1 R |

FOREIGN PATENTS OR APPLICATIONS

| 734,988 | 8/1955 | Great Britain | 85/5 B |
| 1,094,553 | 12/1954 | France | 85/5 B |
| 499,858 | 6/1930 | Germany | 85/5 B |

Primary Examiner—Marion Parsons, Jr.
Attorney—Harry A. Herbert, Jr. and Arsen Tashjian

[57] ABSTRACT

A quick-release disconnect device having a load bearing bolt positioned vertically in a central opening in a main body. A frangible shear pin positioned across the upper part of the central opening prevents vertical movement of an upwardly biased retainer member which retains the load bearing bolt in position by preventing inward movement of a plurality of balls positioned through the wall of the load bearing bolt and in the main body and held against the sidewall of the retainer member. Destruction of the shear pin permits upwardly biased movement of the retainer member allowing the balls to drop inward and release the bolt from the main body.

2 Claims, 2 Drawing Figures

PATENTED FEB 8 1972

3,640,174

INVENTOR.
ROBERT BRUCE EATON
BY Harry A. Herbert Jr.
Arsen Tashjian and
ATTORNEYS

PYROMECHANICAL RELEASE DEVICE

BACKGROUND OF THE INVENTION

This invention relates to a quick release disconnect device having a frangible retention member and, more particularly, the invention is concerned with providing a lightweight reliable pyrorelease device for spacecraft wherein a minimum shock output occurs on explosion and subsequent separation of the elements.

Prior devices having quick uncoupling features actuated by explosive means have subjected the elements to be separated to high shock forces. The various known devices including pin pullers, pin pushers, release nuts, etc., all produce a high shock output which can damage sensitive equipment in the separation area. This shortcoming is particularly significant where the separation takes place under conditions of remote location such as in the upper atmosphere. Thus, to insure safety of operation of a complex instrument package it is most desirable to provide a simple dependable device which will produce a positive separation of elements without the high shock output normally associated with the presently used devices.

SUMMARY OF THE INVENTION

The present invention is concerned with providing a highly reliable mechanical device operated by the initiation of a pyrotechnic element in the form of a shear pin. A plurality of ball members are positioned through the wall of a central opening in the load bearing release bolt and held against the sidewall of a central retainer element and partially within the main body. When the shear pin is destructed, the retainer element is caused to be biased upward releasing the balls which fall into the opening in the load carrying bolt previously occupied by the retainer element thereby releasing the bolt from the main body.

Accordingly, it is an object of the invention to provide a pyroinitiated device for producing a mechanical release of a load carrying element without directly subjecting the released element to the shock of the pyroinitiation.

Another object of the invention is to provide a pyromechanical release device which is light in weight yet highly reliable and not subject to failures inherent in electromechanically initiated devices.

Still another object of the invention is to provide a pyromechanical release device which is relatively simply constructed and operates in an efficient and positive manner.

A further object of the invention is to provide a release device which operates to temporarily secure two elements or parts against relative movement and released the elements upon destruction of a pyroshear pin in response to an electrical signal or the like.

These and other objects, features, and advantages will become more apparent after considering the following detailed description taken in conjunction with the illustrative embodiment in the accompanying drawings wherein like numbers are used throughout to identify like elements.

DESCRIPTION OF A PREFERRED EMBODIMENT

Figure 1:
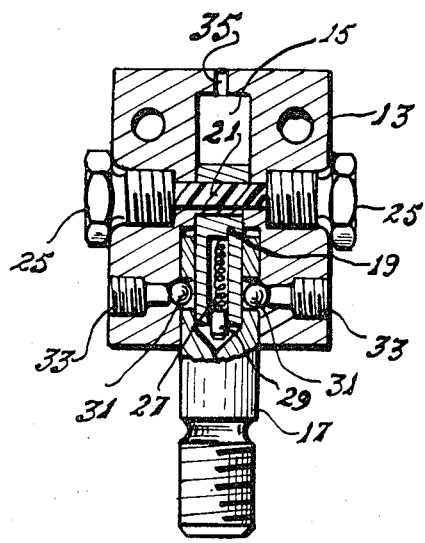
FIG. 1 is a longitudinal view in partial cross section of a pyromechanical release device according to the invention in the assembled condition.

Referring now to FIG. 1, there is shown a view in longitudinal cross section of a pyromechanical release device according to the invention. In the embodiment shown, the device includes a main body 13 having a central opening 15 therein. A load bearing bolt 17 is positioned in the lower part of the central opening 15 and a retainer 19 is positioned in the upper part of the central opening 15. In the assembled condition, the lower part of the retainer 19 is disposed in a central opening in the upper part of the load bearing bolt 17.

A frangible shear pin 21 is positioned horizontally through the upper part of the central opening 15 in the main body 13 and through an aligned opening 23 in the upper part of the retainer 19. A pair of threaded members 25 are positioned in the wall of the main body 13 in alignment with the shear pin 21 and serve to hold it in position as well as to cause the pin 21 to detonate at the desired time in response to an electrical signal. The details of the detonating means are not shown since any conventional electrically initiated system can be used to detonate the frangible shear pin 21.

A spring biasing means 27 is positioned vertically within a central opening in the lower portion of the retainer 19. In the assembled condition, the lower end of the spring 27 rests against a spacer member 29 which is positioned against the lower surface of a central opening in the upper end of the load bearing bolt 17. Thus, the effect of the spring means 27, under compression in the assembled condition, is to urge the retainer 19 upward and the bolt 17 downward.

The frangible shear pin 21 horizontally positioned through the opening 23 in the retainer 19 prevents the upward movement of the retainer 19. A plurality of balls 31 positioned in openings in the upper wall of the load bearing bolt 17 and in the main body 13 operate to prevent the load bearing bolt 17 from moving downward out of the body 13. In the assembled condition (FIG. 1) the balls 31 are prevented from moving inward by the wall of the lower end of the retainer 19 which is disposed in the central opening in the upper end of the bolt 17. Each ball 31 is provided with a holder 33 which may be a setscrew threaded into the body 13 and bearing against the side of the ball 31. Thus, the balls 31 are effectively prevented from moving horizontally and are held in position to prevent any vertical movement of the bolt 17.

MODE OF OPERATION

In operation, it is desired to cause the load bearing bolt 17 to become separated from the main body 13. As shown in FIG. 1, this cannot occur as long as the retainer 19 is held in the down position by the frangible shear pin 21. The spring biasing means 27 cannot move the retainer 19 upward as long as the shear pin 21 is intact.

Figure 2:
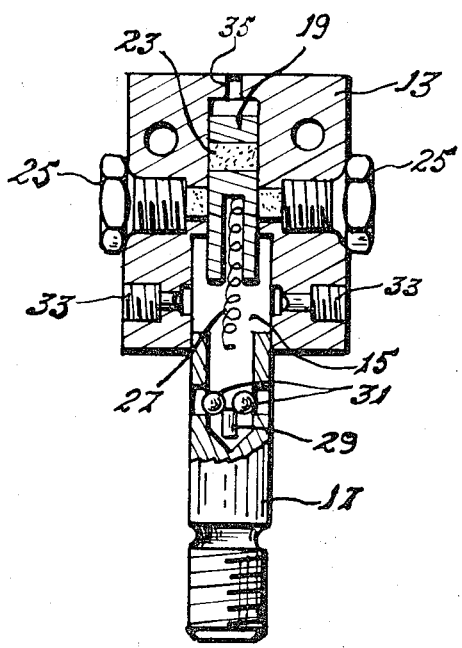
FIG. 2 is a similar view showing the device after pin destruction in the released condition.

Referring now to FIG. 2, there is shown a view of the device immediately after the shear pin 21 has been caused to be destructed by the detonating action of elements 25. The action of the biasing means 27 has caused the retainer, which is now free of restraint, to move upward into the central opening 15. A relief hole 35 is provided to prevent pressure buildup above the retainer 19. When the retainer 19 reaches a certain upward travel, the balls 31 are released and allowed to fall inward into the central opening in the upper end of the load bearing bolt 17. This releases the bolt 17 which is then allowed to become separated from the main body 13 by dropping out of the central opening 15.

Thus, it can be seen that when the body 13 is attached to a fixed structure and a load is attached to the load bearing bolt 17, the separation described above operates to mechanically release the load from the fixed structure. The hereinbefore described device is relatively simple to construct and requires only simple machined parts and no unusually complicated or precision machining operations. Also, it can be seen that only a small releasing force is required which is independent of the load which the mechanical release device is carrying.

Although the invention has been illustrated in the accompanying drawings and described in the foregoing specification in terms of a preferred embodiment thereof, the invention is not limited to this embodiment or to the preferred configuration mentioned. It will be apparent to those skilled in the art that my invention can be practiced by utilizing other techniques for remotely initiating the release of the retainer element which operates to release the load bearing bolt. Also, it should be understood that various changes, alterations, modifications and substitutions, particularly with respect to the construction details, can be made in the arrangement of the several elements without departing from the true spirit and scope of the appended claims.

Having thus described my invention, what I desire to secured by Letters Patent of the United States is:

1. A mechanical release device for disconnecting a releasable element from a fixed support, a main body fixedly attached to the support and having a central opening therein, a load bearing bolt releasably attached to said main body for holding a load element, said load bearing bolt being positioned in the lower part of the central opening in said main body, a retainer slidably positioned in the upper part of the central opening in said main body, the lower part of said retainer being concentrically disposed in a central opening in the upper part of said load bearing bolt, a frangible shear pin horizontally positioned across the upper part of said main body and through an aligned opening in said retainer to prevent vertical movement thereof, a plurality of balls positioned in aligned openings through the wall of said load bearing bolt and against the outer wall of said retainer, said balls extending into recessed areas in said main body to lock said load bearing bolt against downward movement, biasing means disposed between said retainer and load bearing bolt for urging said retainer upward, and means for destructing said frangible shear pin to allow said biasing means to force said retainer upward out of the central opening in said load bearing bolt, thereby allowing said balls to move radially inward from said main body and release said load bearing bolt therefrom.

2. The mechanical release device defined in claim 1 wherein the biasing means for urging said retainer upward includes a coiled compression spring positioned in a central opening in said retainer, the lower end of said compression spring resting against the lower end of the central opening in said load bearing bolt.

* * * * *